US010423445B2

(12) United States Patent
Mishra et al.

(10) Patent No.: US 10,423,445 B2
(45) Date of Patent: *Sep. 24, 2019

(54) COMPOSING AND EXECUTING WORKFLOWS MADE UP OF FUNCTIONAL PLUGGABLE BUILDING BLOCKS

(71) Applicant: Microsoft Technology Licensing, LLC, Redmond, WA (US)

(72) Inventors: Debi Mishra, Cambridge, MA (US); Parry Husbands, Cambridge, MA (US); Sudarshan Raghunathan, Cambridge, MA (US); Andy Linfoot, Boston, MA (US); Damon Hachmeister, North Grafton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/253,251

(22) Filed: Aug. 31, 2016

(65) Prior Publication Data

US 2016/0371117 A1      Dec. 22, 2016

Related U.S. Application Data

(63) Continuation of application No. 14/576,256, filed on Dec. 19, 2014, now Pat. No. 9,436,507.

(Continued)

(51) Int. Cl.
*G06F 9/48* (2006.01)
*G06F 9/44* (2018.01)
(Continued)

(52) U.S. Cl.
CPC .............. *G06F 9/4881* (2013.01); *G06F 8/34* (2013.01); *G06N 20/00* (2019.01); *G06Q 10/06* (2013.01)

(58) Field of Classification Search
CPC ......... G06Q 10/06; G06F 9/4881; G06F 8/34; G06N 99/005
(Continued)

(56) References Cited

U.S. PATENT DOCUMENTS 6,947,936 B1   9/2005   Suermondt et al.
7,403,948 B2 *  7/2008   Ghoneimy ............. G06Q 99/00
                                                        707/792
(Continued)

FOREIGN PATENT DOCUMENTS

CN   101782976 A   7/2010
CN   103502899 A   1/2014
(Continued)

OTHER PUBLICATIONS

Restriction Requirement dated Apr. 25, 2017 in U.S. Appl. No. 14/576,253, 6 pages.
(Continued)

*Primary Examiner* — John Q Chavis
(74) *Attorney, Agent, or Firm* — David Chin; Chin IP, PLLC

(57) ABSTRACT

A platform that provides a way to automatically compose and execute even complex workflows without writing code is described. A set of pre-built functional building blocks can be provided. The building blocks perform data transformation and machine learning functions. The functional blocks have well known plug types. The building blocks can be composed build complex compositions. Input and output files are converted to a standard data type so that modules are pluggable.

18 Claims, 7 Drawing Sheets

Related U.S. Application Data

(60) Provisional application No. 62/023,834, filed on Jul. 12, 2014.

(51) Int. Cl.
   *G06N 99/00* (2019.01)
   *G06N 20/00* (2019.01)
   *G06F 8/34* (2018.01)
   *G06Q 10/06* (2012.01)

(58) Field of Classification Search
   USPC .......................................................... 718/102
   See application file for complete search history.

(56) References Cited

U.S. PATENT DOCUMENTS

| | | | | |
|---|---|---|---|---|
| 7,568,003 | B2* | 7/2009 | Zhang | G06F 16/958 |
| | | | | 709/203 |
| 7,831,995 | B2* | 11/2010 | Futoransky | H04L 63/102 |
| | | | | 713/182 |
| 7,886,264 | B1 | 2/2011 | Peyton et al. | |
| 8,370,279 | B1 | 2/2013 | Lin et al. | |
| 8,417,715 | B1 | 4/2013 | Lin et al. | |
| 8,429,103 | B1 | 4/2013 | Aradhye et al. | |
| 8,561,086 | B2 | 10/2013 | Fleming | |
| 8,601,452 | B2 | 12/2013 | Krasnoiarov | |
| 8,640,087 | B2* | 1/2014 | Sabbouh | G06F 16/972 |
| | | | | 717/106 |
| 8,682,812 | B1 | 3/2014 | Ranjan | |
| 8,806,506 | B2* | 8/2014 | Malladi | G06F 9/546 |
| | | | | 719/313 |
| 9,436,507 | B2* | 9/2016 | Mishra | G06Q 10/06 |
| 10,026,041 | B2 | 7/2018 | Narayanan et al. | |
| 2004/0199896 | A1 | 10/2004 | Goodman et al. | |
| 2006/0095893 | A1* | 5/2006 | Vahid | H04Q 9/00 |
| | | | | 717/109 |
| 2006/0116862 | A1 | 6/2006 | Carrier et al. | |
| 2007/0073753 | A1 | 3/2007 | Baikov | |
| 2007/0124688 | A1 | 5/2007 | Nauerz et al. | |
| 2007/0168402 | A1 | 7/2007 | Mehra et al. | |
| 2008/0065353 | A1 | 3/2008 | Funge et al. | |
| 2009/0220696 | A1 | 9/2009 | Chung et al. | |
| 2009/0228896 | A1 | 9/2009 | Meijer et al. | |
| 2009/0288065 | A1 | 11/2009 | Nathan et al. | |
| 2009/0300404 | A1 | 12/2009 | Branson et al. | |
| 2010/0083281 | A1 | 4/2010 | Malladi et al. | |
| 2012/0158623 | A1 | 6/2012 | Bilenko et al. | |
| 2013/0091557 | A1 | 4/2013 | Gurrapu | |
| 2013/0317803 | A1 | 11/2013 | Manley et al. | |
| 2014/0040170 | A1 | 2/2014 | Zheng et al. | |
| 2014/0046696 | A1 | 2/2014 | Higgins et al. | |
| 2014/0053261 | A1 | 2/2014 | Gupta et al. | |
| 2014/0101076 | A1 | 4/2014 | Martin et al. | |
| 2014/0180738 | A1 | 6/2014 | Phillipps et al. | |
| 2014/0244552 | A1 | 8/2014 | Liu et al. | |
| 2016/0011905 | A1 | 1/2016 | Mishra et al. | |
| 2016/0012318 | A1 | 1/2016 | Bilenko et al. | |
| 2016/0012350 | A1 | 1/2016 | Narayanan et al. | |
| 2017/0372062 | A1* | 12/2017 | Eksten | G06F 21/51 |

FOREIGN PATENT DOCUMENTS

| | | |
|---|---|---|
| RU | 2391791 C2 | 6/2010 |
| WO | 2012103290 A1 | 8/2012 |

OTHER PUBLICATIONS

Final Office Action dated Sep. 14, 2017 in U.S. Appl. No. 14/576,253, 14 pages.
"International Preliminary Report on Patentability in PCT Application No. PCT/US2015/039838", dated Oct. 7, 2016, 13 Pages.
.NET Extensible Objects; Aug. 18, 2014; 7 pages.
Brownlee, Jason, "Best Programming Language for Machine Learning—Machine Learning Mastery", Retrieved from <<http://machinelearningmastery.com/best-programming-language-for-machine-learning/>>, May 25, 2014, 10 pages.
Data structures Advanced R; Aug. 23, 2013; 19 pages.
Enum Types (The Java™ Tutorials_ Learning the Java Language_ Classes and Objects); Nov. 14, 2011; 5 pages.
Morandat, F., Hill, B., Osvald, L., & Vitek, J; Evaluating the design of the R language. In European Conference on Object-Oriented Programming; Jun. 2012; Springer Berlin Heidelberg; pp. 104-131.
Non-Final Office Action dated Mar. 30, 2017 in U.S. Appl. No. 14/576,249, 27 pages.
Quick-R: Data Types; Nov. 27, 2010; 4 pages.
Working with missing data—pandas 0.7; Feb. 13, 2012; 15 pages.
"International Preliminary Report on Patentability in PCT Application No. PCT/US2015/039837", dated Jan. 26, 2017, 9 Pages.
Non-Final Office Action dated Nov. 15, 2016 in U.S. Appl. No. 14/576,253, 7 pages.
"International Preliminary Report on Patentability in PCT Application No. PCT/US2015/039839", dated Sep. 28, 2016, 14 Pages.
"Adaptive Featurization as a Service", Application as filed in U.S. Appl. No. 14/576,253, Mailed Date: Dec. 19, 2014, 19 Pages.
"Alteryx and Revolution Analytics", Retrieved on: Jul. 24, 2014 Available at: http://www.alteryx.com/sites/default/files/resources/files/alt-revo-ds.pdf.
"Cloudify", Published on: Apr. 16, 2014 Available at:http://getcloudify.org/about_us.html.
"Getting Started with Google BigQuery", Retrieved on: Jul. 24, 2014 Available at: https://cloud.google.com/files/articles/google-cloud_technical-article_bigquery.pdf.
"Hybrid Analytics", Retrieved on: Jul. 25, 2014, Available at: http://fatigeo.com/technology/analytics/.
"International Search Report & Written Opinion Issued in PCT Application No. PCT/US2015/039837", dated Sep. 25, 2015, 12 Pages.
"International Search Report and Written Opinion Issued in PCT Patent Application No. PCT/US2015/039838", dated Oct. 20, 2015, 11 Pages.
"International Search Report and Written Opinion Issued in PCT Patent Application No. PCT/US2015/039839", dated Nov. 26, 2015, 13 Pages.
"Interoperable Machine Learning Platform", Application as filed in U.S. Appl. No. 14/576,249, dated Dec. 19, 2014, 22 Pages.
"Renjin—The R programming Language on the JVM", Retrieved on: Jul. 30, 2014 Available at:http:/fwvvw.renjin.org/.
"Second Written Opinion Issued in PCT Application No. PCT/US2015/039838", dated Jul. 4, 2016, 6 Pages.
"Second Written Opinion Issued in PCT Application No. PCT/US2015/039839", dated Jun. 23, 2016, 7 Pages.
Ambite, et al., "Automatically Composing Data Workflows with Relational Descriptions and Shim Services", In the Semantic Web of the series Lecture Notes in Computer Science, vol. 4825, Nov. 11, 2007, pp. 15-29.
Bellosta, Carlos J. Gil, "Package 'rPython': Package Allowing R to Call Python", Retrieved from <<https://web.archive.org/web/20140213201443/http://cran.r-project.org/web/packages/rPython/rPython.pdf>>, Sep. 8, 2013, 7 Pages.
Brownlee, Jason, "Best Programming Language for Machine Learning—Machine Learning Mastery", Retrieved from <<http://machinelearningmastery.com/best-programming-language-for-machine-learning/>>, May 10, 2014, 9 Pages.
Bunch, et al., "MEDEA: A Pluggable Middleware System for Interoperable Program Execution Across Cloud Fabrics", Retrieved on: Jul. 24, 2014, Available at: https://nidhogg.cs.ucsb.edu/research/tech_reports/reports/2012-11.pdf.
Fania, et al., "Predictive Analytics and Interactive Querieson Big Data", In White Paper Intel Reference Architecture Big Data Analytics, Retrieved on: Jul. 24, 2014, 11 pages.
Hakim, Naseem, "Architecting a Machine Learning System for Risk", Retrieved on: Jul. 24, 2014,Available at: http://nerds.airbnb.com/architecting-machine-learning-system-risk/.

(56) References Cited

OTHER PUBLICATIONS

Hall, et al., "The WEKA Data Mining Software: An Update", In ACM SIGKDD Explorations Newsletter, vol. 11, Issue 1, Jun. 2009, pp. 10-18.
Jakimovski, et al., "Framework for Workflow Gridication of Genetic Algorithms in Java", In Lecture Notes in Computer Science of Computational Science,vol. 5103, Jun. 23, 2008, pp. 463-470.
Jiang, et al., "Similarity-Based Online Feature Selection in Content-Based Image Retrieval", In Proceedings of IEEE Transactions on Image Processing, vol. 15, Issue 3, Mar. 31, 2006, 11 Pages.
Krishnaswamy, Jayaram, "Azure ML: Predictive analytics as a Service (PaaaS?)", Published on: Jul. 15, 2014, Available at: http://bigdata.sys-con.com/node/3122578.
Lin, et al., "A Task Abstraction and Mapping Approach to the Shimming Problem in Scientific Workflows", In IEEE International Conference on Services Computing, Sep. 21, 2009, pp. 284-291.
Lordan, et al., "ServiceSs: an Interoperable Programming Framework for the Cloud", In Journal of Grid Computing, vol. 12, Issue 1, Mar. 2013, 20 Pages.
Marozzo, et al., "Enabling Cloud Interoperability with COMPSs", In Proceedings of the Euro-Par Parallel, Aug. 27, 2012, pp. 16-27.
Non-Final Office Action dated Dec. 15, 2016 in U.S. Appl. No. 14/576,256, 6 pages.
Notice of Allowance dated May 10, 2016 in U.S. Appl. No. 14/576,256, 6 pages.
Ooms, Jeroen , "The OpenCPU System: Towards a Universal Interface for Scientific Computing through Separation of Concerns", In Proceedings of the Computing Research Repository, Jun. 19, 2014, 23 Pages.
Patel, et al., "A Platform for Parallel R-based Analytics on Cloud Infrastructure", In International Conference on Parallel Processing Workshops, Sep. 10, 2012, pp. 188-193.
PCT Application No. PCT/US2015/039830, Chapter II Demand and Demand for an International Preliminary Examination According to Article 31 PCT, dated Feb. 29, 2016, 17 pages.
PCT Application No. PCT/US2015/39838, Chapter II Demand, Amendments and Letter Accompanying the Amendment, dated Feb. 3, 2016, 16 pages.
Rozsnyai, et al., "Business Process Insight: An Approach and Platform for the Discovery and Analysis of End-to-End Business Processes", In Proceeding of SRII Global Conference (SRII), Jul. 24, 2012, pp. 80-89.
Sengal, et al., "Understanding Application-LevelInteroperability: Scaling-Out MapReduce Over High-Performance Grids and Clouds", In Journal Future Generation Computer Systems, vol. 27, Issue 5, May 1, 2011, 14 Pages.
Yu, et al., "Feature Selection for High-Dimensional Data: A Fast Correlation-Based Filter Solution", In Proceedings of the Twentieth International Conference on Machine Learning, Aug. 21, 2003, pp. 856-863.
Cleary, Andrew, et al. "Language Interoperability Mechanisms for High-Performance Scientific Applications" No. UCRL-JC-131823. Lawrence Livermore National Laboratory (LLNL), Livermore, CA, Sep. 1998. 13 Pages.
Final Office Action dated Nov. 15, 2017 in U.S. Appl. No. 14/576,249, 32 pages.
Notice of Allowance dated Mar. 18, 2018 in U.S. Appl. No. 14/576,249, 5 pages.
"Non Final Office Action Issued in U.S. Appl. No. 14/576,253", dated Jul. 9, 2018, 14 Pages.
"First Office Action Issued in Chinese Patent Application No. 201580038042.7", dated Jul. 4, 2018, 13 Pages.
"Final Office Action Issued in U.S. Appl. No. 14/576,253", dated Dec. 27, 2018, 14 Pages.
"Second Office Action Issued in Chinese Patent Application No. 201580038042.7", dated Jan. 18, 2019, 10 Pages.
"Office Action Issued in Russian Patent Application No. 2017100479", dated Jan. 31, 2019, 8 Pages. (W/o Translation).

* cited by examiner

US 10,423,445 B2

COMPOSING AND EXECUTING WORKFLOWS MADE UP OF FUNCTIONAL PLUGGABLE BUILDING BLOCKS

CROSS-REFERENCE TO RELATED APPLICATIONS

This application is a continuation of U.S. patent application Ser. No. 14/576,256, filed Dec. 19, 2014, entitled "COMPOSING AND EXECUTING WORKFLOWS MADE UP OF FUNCTIONAL PLUGGABLE BUILDING BLOCKS," now U.S. Pat. No. 9,436,507, issued Sep. 6, 2016, which claims the benefit of U.S. Prov. Pat. App. No. 62/023,834, filed Jul. 12, 2014, entitled "COMPOSING AND EXECUTING WORKFLOWS MADE UP OF FUNCTIONAL PLUGGABLE BUILDING BLOCKS." The entirety of each of these afore-mentioned applications is incorporated herein by reference.

BACKGROUND

Instead of just following explicitly programmed instructions, some computing systems can learn by processing data. The process whereby a computing system learns is called machine learning. Machine learning can be advantageously employed wherever designing and programming explicit, rule-based algorithms for data computation is insufficient. Machine learning often is based on a statistical mathematical model. A mathematical model describes a system using mathematical concepts and language. A mathematical model is often used to make predictions about future behavior based on historical data.

SUMMARY

Complex functionality that can be delivered as a hosted cloud application can be provided without writing code. Building blocks that provide common functionality can be composed into a workflow (a sequence of operations) using a drag and connect paradigm. An execution environment can execute the workflow. The workflow can be as complex or as simple as desired and can include numerous stages of computation and various data flows. Computations can include ingesting and transforming data, creating optimizers and/or applying machine learning (ML) algorithms. Composed workflows can be automatically operationalized and published as a web service. The workflow can be published as a web end point.

A platform that standardizes the way functional building blocks are composed together in a plug and play manner is described. The platform can compose and execute complex workflows automatically without the need for a user to write program code or provide instructions. A set of pre-built pluggable functional building blocks can provide data transformation and/or machine learning functions. The functional blocks can use well known plug types. An authoring tool can enable the authoring of workflows using the functional building blocks. A testing tool can enable the testing of the workflows. The composed workflow can be published as an operational web service as a REST (representational state transfer) end point on a cloud computing platform such as but not limited to Microsoft's Azure ML. A REST API (application programming interface) is a public URL that can be entered into a browser's address line. It contains no state so that any data needed to produce output is in the URL itself. The interface can be abstracted so that the user does not need to know any specific technology in order to communicate with it. This can enable a user such as but not limited to a developer or data scientist to author their workflows using a simple drag and connect paradigm. The workflows can be tested and provided as production web services without writing any code. Plugability between functional building blocks can be provided by using standardized interfaces for communication between the different functional building blocks. The execution environment for the functional building blocks can automatically convert between different interfaces, schemas and data formats.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A workflow composition platform (e.g., a Predictive Analytics Platform, a machine learning platform, a non-ML platform, etc.) as described herein can be an extensible, cloud-based, multi-tenant service for authoring and executing (in testing or production) data science workflows. Workflows of any degree of complexity can be created. A composed workflow (called an experiment) can be executed one or more times using one or more datasets. The workflow can be published as REST (representational state transfer) end point on a cloud computing platform (such as but not limited to Microsoft's Azure ML). A user such as but not limited to a developer or data scientist can author a workflow using a simple drag-and-connect paradigm. The workflow can be tested and provided as production web services without writing any code.

In accordance with aspects of the subject matter described herein, functional building blocks from which workflows are composed, can be standard functional components that adhere to particular design patterns, data interface standards, input/output data types, and parameter specifications. A functional building block can include a pluggable module and the data (e.g., one or more datasets) on which the pluggable module operates. Each functional building block can be associated with an interface. The interface describes what type of data the functional building block produces and what type of data the functional building block accepts. Schemas can be standardized to enable plugability of functional blocks. The term "plugability" as used herein means that the functional building blocks are automatically interoperable without requiring the user to do any conversion coding for schemas, data, program code or interfaces. When building blocks are pluggable, legal connections can be allowed and illegal connections can be disallowed because compatibility between blocks is discernable. Schemas can be standardized so that pluggable modules can interpret and/or modify schemas. A standardized data table object can incorporate schemas (e.g., ML schemas). The data connection plug-in between modules can be the data table object. An execution environment can provide plugability for a spectrum of data types and schemas into the standard data table interface. To run an experiment, an application can send the experiment graph (e.g., composed workflow) to a job execution service (JES). The experiment graph can include the dependency structure which can control the order of execution along with pointers to the code and data needed at each graph node. The JES can then schedule execution of each graph node at a resource. Information can be communicated back to the application to de displayed. An authoring tool can provide a user the means to author a workflow using a drag and connect paradigm. A directed acyclic graph (DAG) manager can parse a workflow, the elements of which can be executed by a module execution environment (module runtime).

Figure 1A:
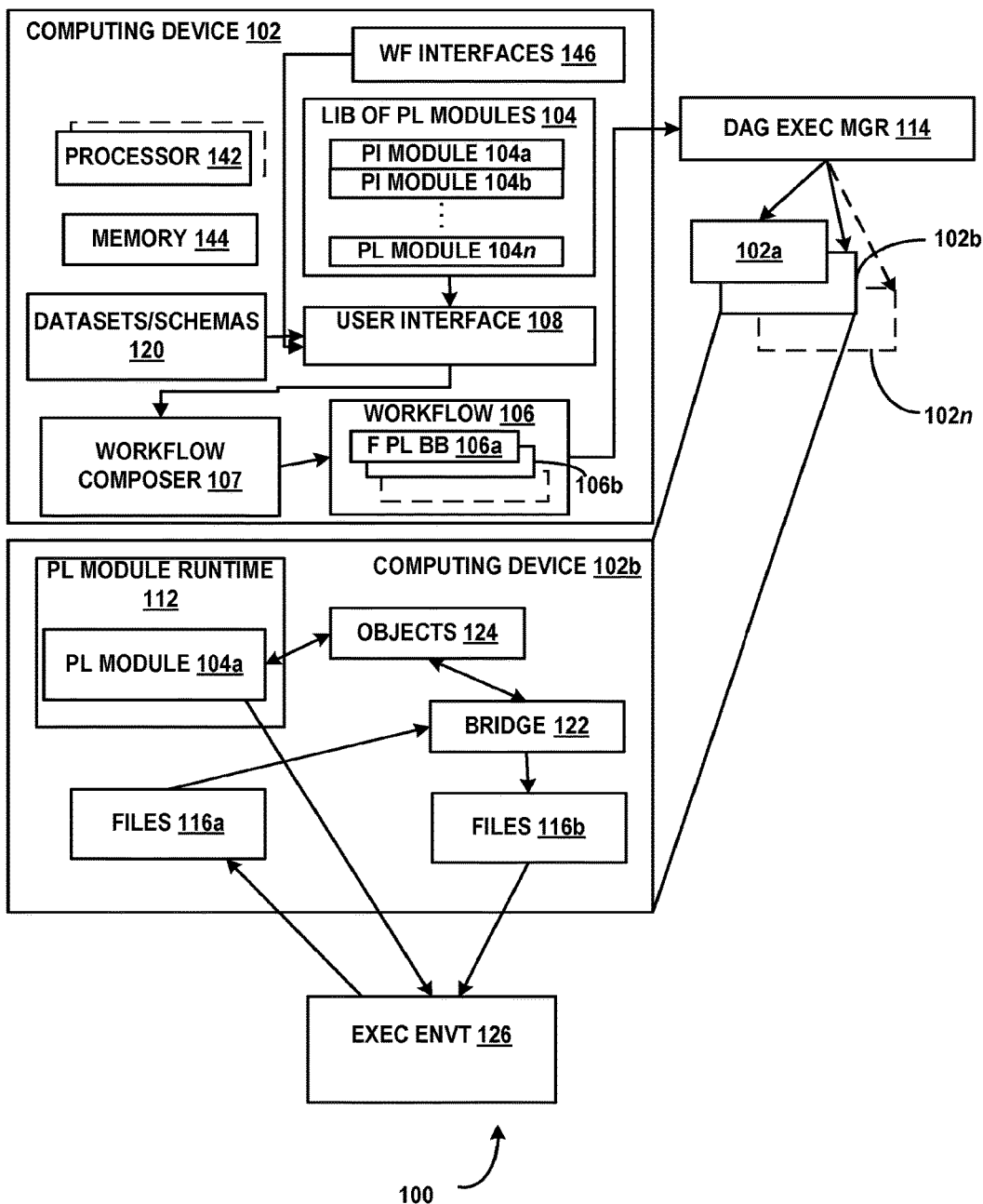
FIG. 1a illustrates an example of a system 100 comprising a predictive analytics platform in accordance with aspects of the subject matter disclosed herein.

Tool and Platform to Compose and Execute Arbitrarily Complex Workflows Made Up of Functional Pluggable Building Blocks FIG. 1a illustrates an example of a system 100 comprising a predictive analytics/machine learning platform in accordance with aspects of the subject matter disclosed herein. While described within the context of a machine learning system, it will be appreciated by those of skill in the art that the subject matter described herein is not so limited and can be applied in a non-machine learning context. System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, and so on. A computing device such as computing device 102 can include one or more processors such as processor 142, etc., and a memory such as memory 144 that communicates with the one or more processors.

System 100 can include an environment that supports authoring a workflow using a simple drag and connect paradigm. Wrappers around native library elements can be provided for array manipulation, slicing and operators. In-memory tabular data can be provided in a column-oriented data structure. Serialization (e.g., from objects to files) can be provided. Streaming data support for module connection can be provided. Support for categorical/ordinal data types and multi-categorical data types can be provided. A categorical data type refers to a data type in which legal values are those values which belong to a specified list of values. Standardized access to machine learning metadata in a dataset can be provided.

Pluggable modules can be provided with thin wrappers around Analytics Framework APIs (application programming interfaces) with annotations to expose them to the authoring and execution service. APIs can be well-layered, composable, consistent and developer friendly by making use of standard interfaces and basic data types such as N-dimensional arrays, sparse matrices and data tables, by the consistent use of a rich "dataset schema" that provides access to machine learning-specific attributes such as feature channels, features, labels, scores as well as statistics about the data in a uniform manner across all API functions and by conformance to design guidelines (e.g., to the ".NET Framework Design Guidelines").

System 100 may include one or more computing devices on which any one or any combination of the following reside: one or more program modules comprising a workflow composer such as workflow composer 107, one or more program modules comprising a user interface such as user interface 108, a pluggable module library such as library of pluggable modules 104 including one or more functional building blocks such as pluggable module 104a, pluggable module 104b . . . pluggable module 104n, interfaces 146, one or more descriptions of modules (not shown), one or more descriptions of datasets, one or more descriptions of schemas associated with the datasets, one or more descriptions of interfaces, one or more program modules comprising a bridge such as bridge 122 that can translate data formats, metadata schema and interfaces from a first type of data (e.g., a file) to a second type of data (e.g., an object). Functional building blocks such as pluggable module 104a, and its associated dataset can be a standard functional component that meets specified design patterns, data interface standards, input/output data types, and parameter specifications. Functional building blocks can be composed into a workflow.

In the machine learning platform represented in system 100, a user can employ a drag and connect paradigm in a user interface (e.g., user interface 108) to identify and/or select pluggable modules and datasets/schemas to be composed into a workflow and to describe how the pluggable modules are connected. An interface associated with the functional building block identifies what the functional building block produces and what the functional building block accepts. Pluggable modules and datasets/schemas can be identified by selecting a description of the modules, and/or datasets/schemas. Inputs to the pluggable module can be specified. Outputs from the pluggable module can be specified. Input can be data over which the pluggable module will operate. Data can include one or more datasets and/or schemas such as datasets/schemas 120. System 100 can include machine learning schema. Machine learning schema can be standardized. Standardization of machine learning schema can enable functional components to be pluggable. Data can be objects such as DataTable objects. Such an object, which is a representation of two-dimensional tabular data and its corresponding schema, can be a type of representation used by the machine learning platform. Input can be parameters for the module. Output can be results of the computations on the data. System 100 can include one or more program modules that comprise a module-loading program. System 100 can include one or more program modules that comprise a dataset/schema loading program. Loaded modules can be located in a pluggable module library such as library of pluggable modules 104. The pluggable module library and datasets may be stored on one or more backend computing devices. Selected pluggable modules and datasets/schemas (e.g., functional pluggable building blocks such as functional pluggable building block 106a, functional pluggable building block 106b, etc. can be composed to create a workflow such as workflow 106. Thus workflow 106 can include a number of tasks, where each task is performed by a executing a functional pluggable building block.

When the workflow is executed, a DAG (directed acyclic graph) execution manager such as DAG execution manager 114 can receive a composed workflow from an application and can send the composed workflow (e.g., an experiment graph) to a job execution service. The DAG execution manager can schedule the tasks that make up the composed workflow to execute on one or more computing resources such as computing resource 102a, computing resource 102b . . . to computing resource 102n. Computing resources can be computing devices, virtual machines, and so on. During workflow execution the workflow interface associated with the executing functional building block (pluggable module plus dataset(s)) enables the automatic invocation of the bridge to transform the output of one pluggable module into a form that is acceptable as input to the next pluggable module. The pluggable module itself can be written to one of a small number of standardized pluggable module interfaces. All of the transformations needed to allow communications between pluggable modules is automatically performed outside pluggable module execution by the bridge software. A pluggable module such as pluggable module 104a, etc. executing on a computing resource can execute in a pluggable module execution environment or module runtime such as module runtime 112. The module execution runtime (e.g., module runtime 112) can use the appropriate workflow interface to abstract away details such as input and output file location and format by converting input files into DataTable object types such as objects 124, parsing the rest of the arguments, calling the pluggable module, then serializing output objects into files such as files 116b. Input to the pluggable module execution environment can be in the form of files 116a. A bridge such as bridge 122 can convert the files into objects (e.g., DataTable objects) and can send the objects to pluggable module 104a. Thus, the modules can be written with signatures such as: Tuple<DataTable, DataTable> Module(DataTable input1, DataTable input2, int parameter1, double parameter2) and so on. The pluggable module can communicate over a bridge such as bridge 122 to another execution environment such as execution environment 126. Execution environment 126 can be an execution environment operating on another computing resource such as computing resource 102a, etc. The DAG execution manager can be notified of the results. The DAG execution manager can wait until all the scheduled tasks are done before sending back results for the entire workflow to the application (not shown).

Thus, a pluggable module can receive input such as data and a schema for the data. The schema can be standardized so that functional components of system 100 can interpret and/or modify the schema. The data and its corresponding schema can be incorporated into a standardized object. The object can provide the data connection plug-in between modules. The objects can provide plugability of a spectrum of data types and schema into the standard object interface. A DAG (directed acyclic graph) execution manager such as DAG execution manager 114 can parse any workflow. DAG execution manager 114 can use a pluggable module runtime such as pluggable module runtime 112 to execute a task.

The pluggable module execution runtime (e.g., pluggable module runtime 112) can abstract away details such as input and output file location and format by converting input files into DataTable types, parsing the rest of the arguments, calling the module, then serializing output objects into files.

Figure 1B:
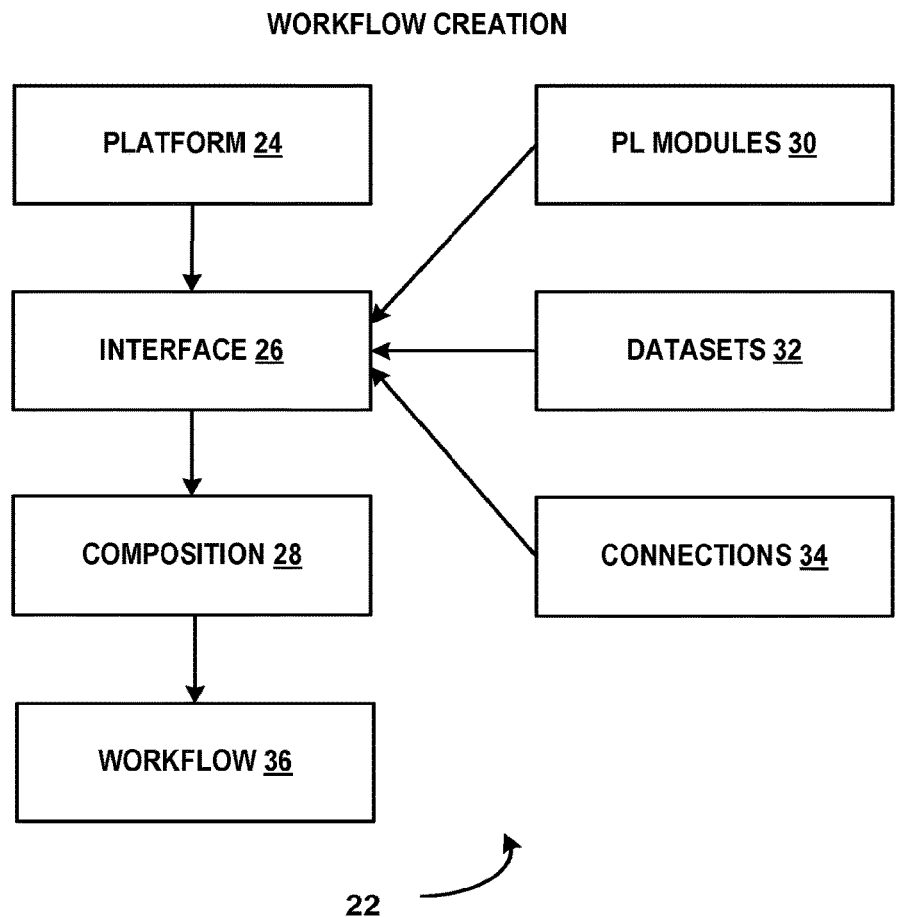
FIG. 1b illustrates an example of workflow creation in accordance with aspects of the subject matter disclosed herein.

FIG. 1b is a block diagram illustrating an example of workflow creation 22 in accordance with aspects of the subject matter disclosed herein. A platform such as platform 24 can be accessed. A platform can include hardware and software existing in an environment in which a collection of software is designed to run, obeying its constraints, and making use of its facilities. Typical platforms include a hardware architecture, an operating system (OS), and runtime libraries and executables. Platform 24 may enable datasets, schemas, training models, and so on to be loaded into a workspace. An interface such as interface 26 can be launched. Interface 26 can be an interface that enables a workflow such as workflow 36 to be defined. Interface 26 may receive user input specifying pluggable modules such as pluggable modules 30 to be used in the creation of a workflow such as workflow 36. Interface 26 may receive user input specifying datasets such as datasets 32 to be operated upon by the pluggable modules 30. Interface 26 may receive user input specifying connections such as connections 34 to be used in the creation of workflow 36. Connections can include connections between pluggable modules (e.g., which pluggable module's output is input to which pluggable module, etc.) and inputs and outputs of pluggable modules. Composition 28 can compose the modules, datasets and connections into workflow 36.

Figure 1C:
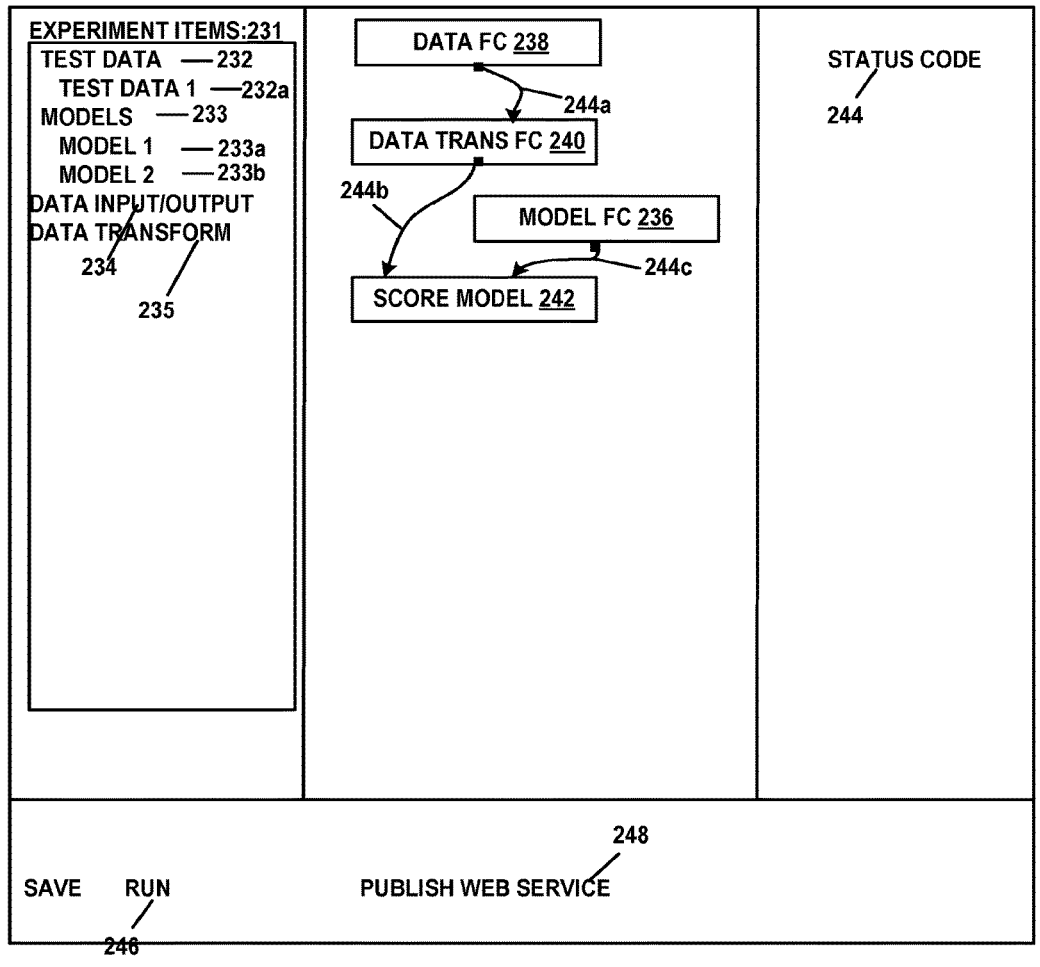
FIG. 1c illustrates an example of a user interface 230 for creating a workflow in accordance with aspects of the subject matter disclosed herein.

FIG. 1c illustrates an example of a user interface 230 that can be used to create a workflow using the functional building blocks, and to test the composed workflow. In accordance with some aspects of the subject matter described herein, a list of experiment items such as list of experiment items 231 can be displayed. A list of experiment items can include one or any combination of items such as but not limited to: test data (e.g., test data 232), trained models (e.g., models 233), data input and output (e.g., data input/output 234), data transformations (e.g., data transform 235), feature selection (not shown), machine learning (not shown), language modules (not shown), statistical functions (not shown) and/or text analytics (not shown). Any one or any combination of the items in the experiment items lists can be expanded to display the items of that category. For example, expanding test data can result in the display of test data sets, expanding trained models can result in the display of trained models and so on.

The trained model, input data and any data transformations that are to be performed can be entered into the corresponding flow containers. For example, a trained model such as model 1 233a or model 2 233b can be selected for use in the scoring experiment by, for example, clicking and dragging model 1 233a or model 2 233b from the experiment list 231 into the model flow container model fc 236. Test data such as test data 232a can be selected for use in the scoring experiment by, for example, clicking and dragging test data 232a into test data flow container data fc 238. Data provided to the experiment can be labeled or unlabeled data. Labeled data is data for which the outcome is known or for which an outcome has been assigned. Unlabeled data is data for which the outcome is unknown or for which no outcome has been assigned. Data provided to the experiment can be test or production data. Data transformation instructions such as, for example, "ignore column 1" can be indicated by, for example, clicking and dragging saved transformations from the experiment list 231 or entering the desired data transformations in data transformations flow container data trans fc 240.

The inputs and outputs to the score model module indicated in the score model flow container score model 242, can be indicated by drawing flow connectors such as flow connectors 244a, 244b and 244c. For example, flow connector 244a indicates that the data indicated in data flow container data fc 238 (e.g., test data 232a) is input to the data transformation indicated in data flow container data trans fc 240 (e.g., "ignore column 1") and the transformed data and the model indicated in model flow container model fc 236 (e.g., model 1 233a) are input to the score model module score model 242. The output from the score model module score model 242 can also be designated. The status of the experiment (e.g., Draft or Finished) can be displayed as the Status Code (e.g., status code 244).

Selecting the RUN option, option 246 can trigger the running of the experiment, invoking an experiment execution module. After the experiment has been run, the experiment can be saved and an option to publish the experiment as a service can be displayed, as illustrated by the option publish web service 248.

Figure 1D:
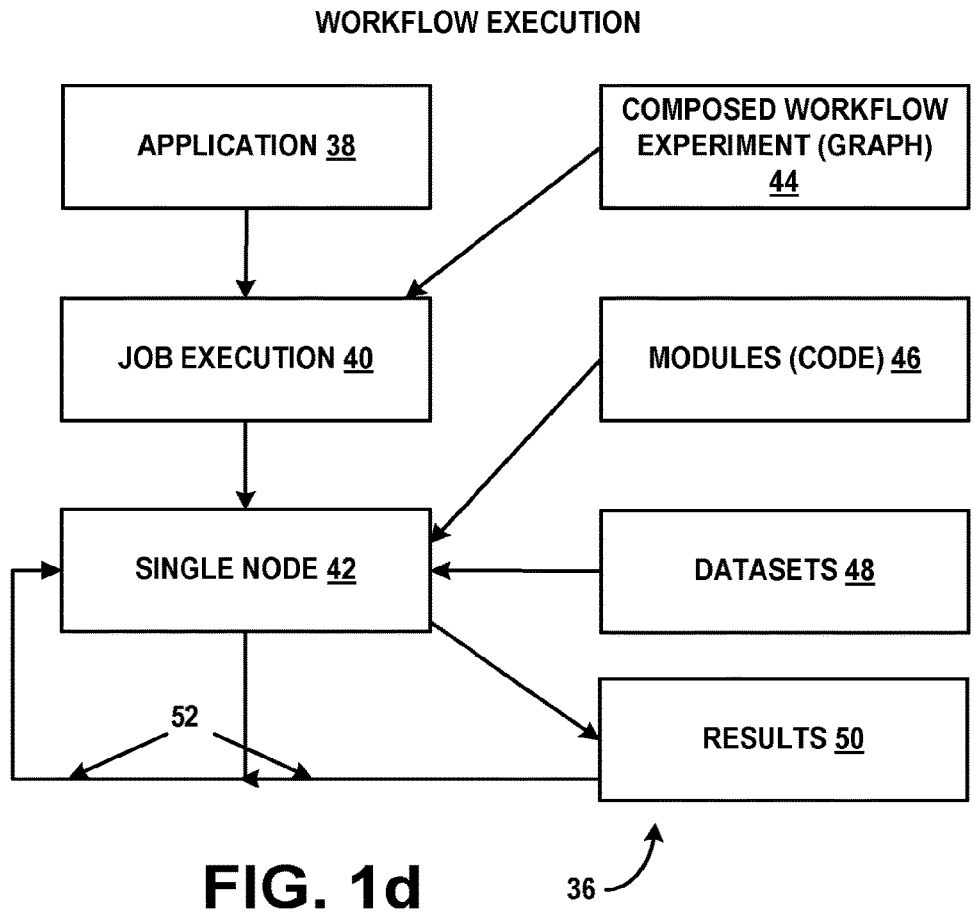
FIG. 1d illustrates an example of module execution in accordance with aspects of the subject matter disclosed herein.

FIG. 1d depicts a block diagram illustrating an example of workflow execution 36 in accordance with aspects of the subject matter disclosed herein. An application such as application 38 can be any application that executes a workflow composed of functional pluggable blocks. An application can be executed by selecting a job execution function such as job execution 40. Inputs to the job execution can be a composed workflow comprising a directed acyclic graph such as composed workflow 44. A composed workflow 44 (such as an experiment graph) can be a composed workflow as described more fully above. A DAG execution manager as described more fully above can break the workflow into tasks and can assign tasks to computing resources. A task can be assigned to a single node such as single node 42. Modules such as modules 46 and datasets such as datasets 48 on which the module(s) operate can be assigned to a single node 42 representing a computing resource. The module can execute and results such as results 50 can be returned to the DAG execution manager or can be stored until retrieved. Results 50 can be sent to the next task in the composed workflow, e.g., to another node, as depicted by directional arrows 52. When all the nodes executing the workflow have completed the results can be returned to application 38.

Figure 1E:
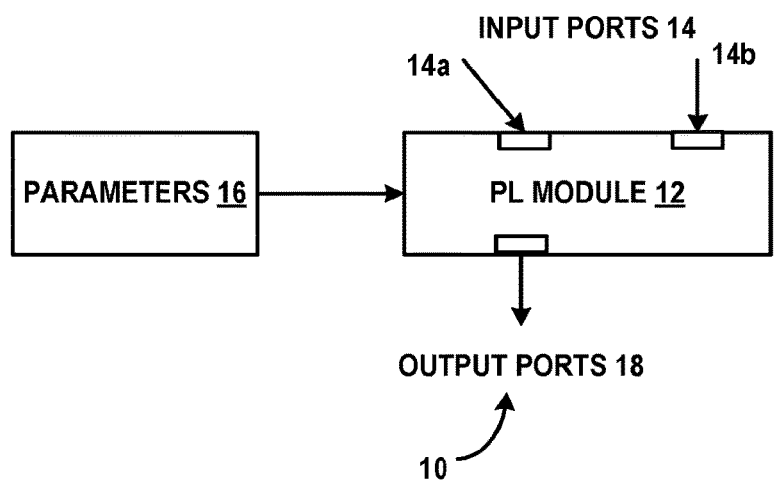
FIG. 1e illustrates an example of data flow in a portion of the platform of FIG. 1a in accordance with aspects of the subject matter disclosed herein.

FIG. 1e illustrates an example 10 of elements of a pluggable module that can be exposed to a user during workflow creation using the interface. The pluggable module 12 can receive input from one or more input ports 14 such as input port 14a and input port 14b. Pluggable module 12 can be a standard functional component that meets specified design patterns, data interface standards, input/output data types, and parameter specifications. Pluggable modules such as pluggable module 12 can provide the core computational building blocks of which workflows are composed. Input ports 14 can be exposed to the user to enable the user to select data to be processed by the pluggable module 12. Output port 18 enables the user to select where the output from pluggable module 12 goes. Parameters 16 can include parameters provided to the pluggable module 12.

Figure 1F:
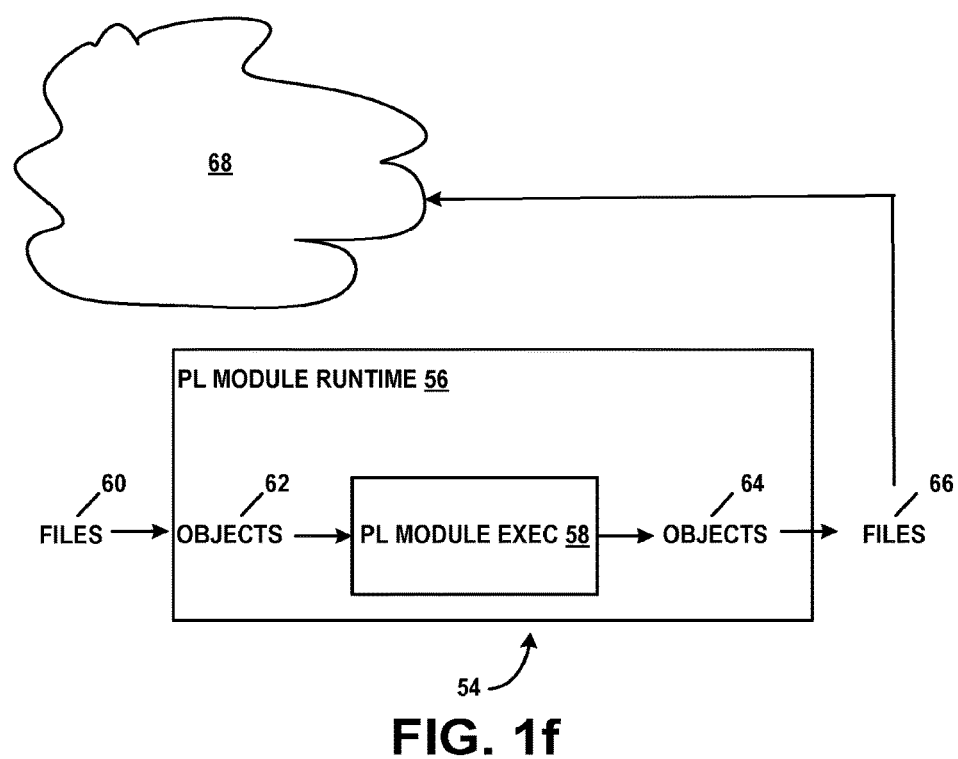
FIG. 1f illustrates an example of data flow in a portion of the platform of FIG. 1a in accordance with aspects of the subject matter disclosed herein.

FIG. 1f is a block diagram illustrating an example 54 of execution of a pluggable module in accordance with aspects of the subject matter disclosed herein. The pluggable module execution runtime (e.g., pluggable module runtime 56) can abstract away details such as input and output file location and data format by using an executable container (e.g., referred to herein as pluggable module runtime 56). The container can be responsible for converting input files 60 into objects such as objects 62 (e.g., DataTable objects), parsing arguments, calling the pluggable module executable 58. Objects 64 produced by the pluggable module executable 58 can be serialized into files 66 which can be sent on to the next functional block in the workflow indicated by cloud 68 or saved for future examination or use in other workflows.

Figure 2:
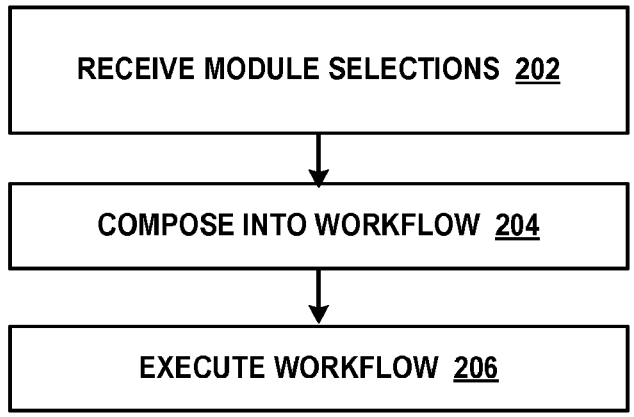
FIG. 2 illustrates an example of a method 200 comprising a method of composing and executing workflows in accordance with aspects of the subject matter disclosed herein.

FIG. 2 illustrates an example of a method 200 for creating, composing and executing workflows made up of pluggable building blocks in accordance with aspects of the subject matter described herein. The method described in FIG. 2 can be practiced by a system such as but not limited to the ones described with respect to FIGS. 1a-f. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. At operation 202, a selection of modules can be received. At operation 204 the modules can be composed into a workflow. At operation 206 a workflow can be executed.

Described herein is a system including at least one processor, a memory connected to the at least one processor and at least one program module loaded into the memory, the at least one program module providing automatic interoperability between a plurality of pluggable functional building blocks comprising at least a first functional building block and a second functional building block of a workflow by executing a second functional building block of the plurality of pluggable functional building blocks in a runtime container wherein the runtime container automatically transforms output produced by the first pluggable functional building block into input acceptable by the second pluggable functional building block. The system can include at least one program module loaded into the memory, wherein the at least one program module comprises a bridge that uses a standardized workflow interface for communication between the second pluggable functional building block and the first pluggable functional building block. The system can include at least one program module loaded into the memory, wherein the at least one program module comprises a bridge that automatically converts between a workflow interface associated with the first pluggable functional building block to a workflow interface associated with the second pluggable functional building block. The system can include at least one program module loaded into the memory, wherein the at least one program module comprises a bridge that automatically converts between a schema associated with the first pluggable functional building block to a schema associated with the second pluggable functional building block. The system can include at least one program module loaded into the memory, wherein the at least one program module comprises a bridge that automatically converts between a data format associated with the first pluggable functional building block to a data format associated with the second pluggable functional building block. The system can include at least one program module loaded into the memory, wherein the at least one program module comprises a bridge that converts a file produced by the first pluggable functional building block into an object acceptable by a pluggable module of the second functional building block. The system can include at least one program module loaded into the memory, wherein the at least one program module comprises a bridge that serializes an object produced by the first functional building block into a file acceptable by a pluggable module of the second pluggable functional building block.

Described is a method in which a processor of a computing device provides automatic interoperability between a plurality of pluggable functional building blocks comprising at least a second pluggable functional building block and a first pluggable functional building block of a workflow by executing a second pluggable functional building block of the plurality of pluggable functional building blocks in a runtime container wherein the runtime container automatically transforms output produced by the first pluggable functional building block into input acceptable by the second pluggable functional building block. Automatic means that the module runtime container performs the transformation (conversion) programmatically without requiring human interaction. A standardized workflow interface for communication between the second pluggable functional building block and the first pluggable functional building block can be used. Converting between a workflow interface associated with the first pluggable functional building block to a workflow interface associated with the second pluggable functional building block can be automatic. Converting between a data format associated with the first pluggable functional building block to a data format associated with the second pluggable functional building block can be automatic. Converting a file produced by the first pluggable functional building block into an object acceptable by a pluggable module of the second pluggable functional building block can be automatic. An object produced by the second pluggable functional building block can be serialized into a file acceptable by a pluggable module of the first pluggable functional building block.

A computer-readable storage medium comprising computer-readable instructions which when executed cause at least one processor of a computing device to provide a plurality of pluggable functional building blocks, wherein a second pluggable functional building block of the plurality of pluggable functional building blocks is a building block that is automatically interoperable with a first pluggable functional building block and in response to receiving a selection of at least two of the plurality of pluggable functional building blocks and a connection indication between the at least two of the plurality of functional building blocks, automatically compose a workflow comprising the first pluggable functional building block and the second pluggable functional building block, wherein the output of the first pluggable functional building block is automatically transformed into acceptable input for the second pluggable functional building block when the workflow is executed is described. The computer-readable storage medium can include further computer-readable instructions which when executed cause the at least one processor to use a standardized workflow interface for communication between the first pluggable functional building block and the second pluggable functional building block. The computer-readable storage medium can include further computer-readable instructions which when executed cause the at least one processor to automatically convert between a workflow interface associated with the first pluggable functional building block to a workflow interface associated with the second pluggable functional building block. The computer-readable storage medium can include further computer-readable instructions which when executed cause the at least one processor to convert between a schema associated with the first pluggable functional building block to a schema associated with the second pluggable functional building block. The computer-readable storage medium can include further computer-readable instructions which when executed cause the at least one processor to automatically convert between a data format associated with the first pluggable functional building block to a data format associated with the second pluggable functional building block. The computer-readable storage medium can include further computer-readable instructions which when executed cause the at least one processor to automatically convert a file produced by the first pluggable functional building block into an object acceptable by a pluggable module of the second pluggable functional building block. The computer-readable storage medium can include further computer-readable instructions which when executed cause the at least one processor to automatically publish the workflow as a web service.

Example of a Suitable Computing Environment

Figure 3:
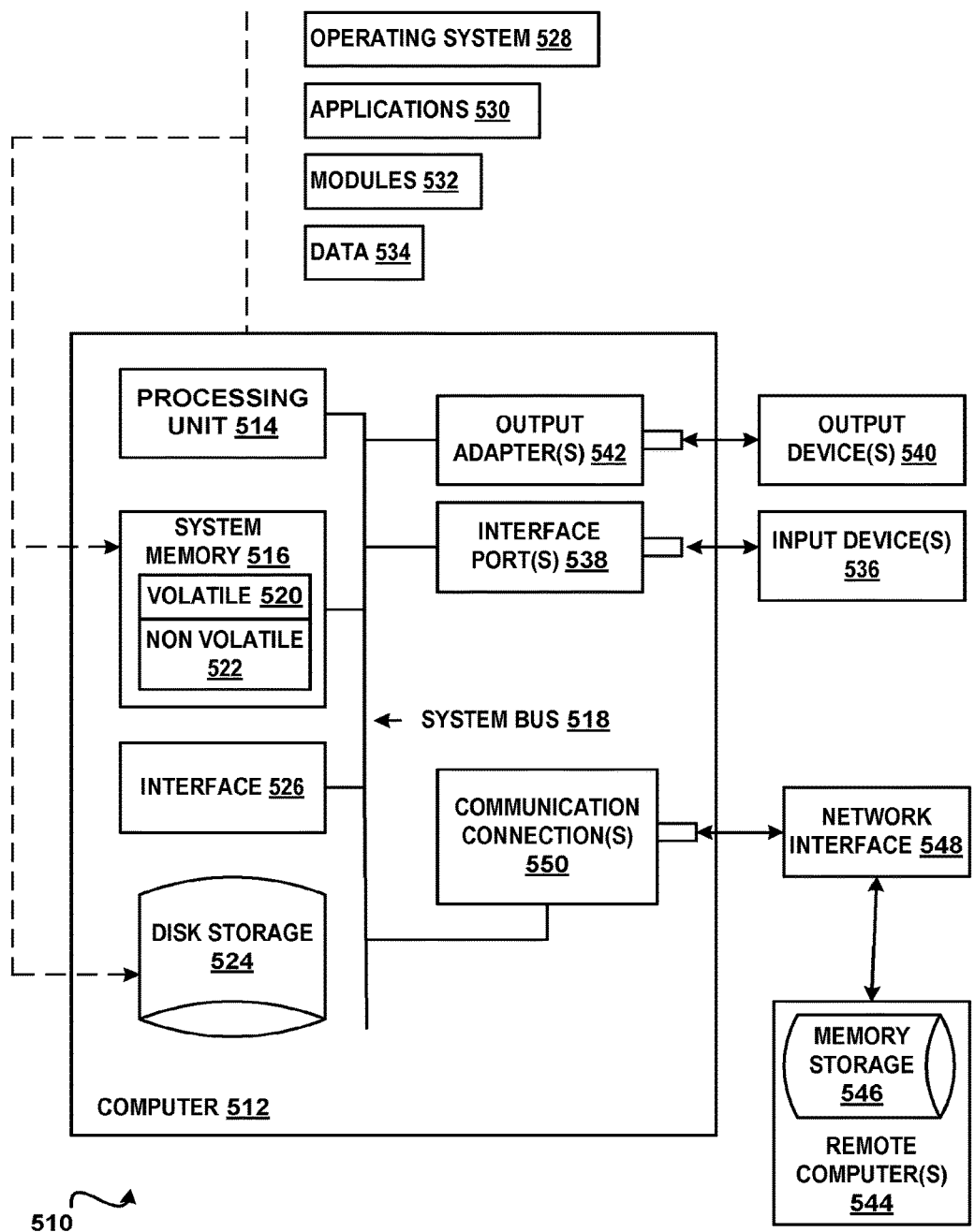
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A machine-readable storage medium have stored therein computer-readable instructions which when executed cause at least one processor of a computing device to:
receive an indication of input data and a data transformation instruction;
in response to receiving a selection of at least two of a plurality of pluggable functional building blocks and a connection indication between the at least two of the plurality of functional building blocks, automatically compose a workflow comprising a first pluggable functional building block and a second pluggable functional building block, wherein output of the first pluggable functional building block is automatically transformed into acceptable input for the second pluggable functional building block by the workflow utilizing the input data and the data transformation instruction; and
automatically publish the workflow as a web service.

2. The machine-readable storage medium of claim 1, having stored therein further computer-readable instructions which when executed cause the at least one processor to:
use a standardized workflow interface for communication between the first pluggable functional building block and the second pluggable functional building block.

3. The machine-readable storage medium of claim 1, having stored therein further computer-readable instructions which when executed cause the at least one processor to:
automatically convert between a workflow interface associated with the first pluggable functional building block to a workflow interface associated with the second pluggable functional building block.

4. The machine-readable storage medium of claim 1, having stored therein further computer-readable instructions which when executed cause the at least one processor to:
convert between a schema associated with the first pluggable functional building block to a schema associated with the second pluggable functional building block.

5. The machine-readable storage medium of claim 1, having stored therein further computer-readable instructions which when executed cause the at least one processor to:
automatically convert between a data format associated with the first pluggable functional building block to a data format associated with the second pluggable functional building block.

6. The machine-readable storage medium of claim 1, having stored therein further computer-readable instructions which when executed cause the at least one processor to:
automatically convert a file produced by the first pluggable functional building block into an object acceptable by a pluggable module of the second pluggable functional building block.

7. A computing device, comprising:
at least one memory and at least one processor, wherein the at least one memory and the at least one processor are respectively configured to store and execute instructions that cause the computing device to perform operations, the operations comprising:
receiving an indication of input data and a data transformation instruction;
in response to receiving a selection of at least two of a plurality of pluggable functional building blocks and a connection indication between the at least two of the plurality of functional building blocks, automatically composing a workflow comprising a first pluggable functional building block and a second pluggable functional building block, wherein output of the first pluggable functional building block is automatically transformed into acceptable input for the second pluggable functional building block by the workflow utilizing the input data and the data transformation instruction; and
automatically publishing the workflow as a web service.

8. The computing device of claim 7, wherein the operations further comprise:
using a standardized workflow interface for communication between the first pluggable functional building block and the second pluggable functional building block.

9. The computing device of claim 7, wherein the operations further comprise:
automatically converting between a workflow interface associated with the first pluggable functional building block to a workflow interface associated with the second pluggable functional building block.

10. The computing device of claim 7, wherein the operations further comprise:
converting between a schema associated with the first pluggable functional building block to a schema associated with the second pluggable functional building block.

11. The computing device of claim 7, wherein the operations further comprise:
automatically converting between a data format associated with the first pluggable functional building block to a data format associated with the second pluggable functional building block.

12. The computing device of claim 7, wherein the operations further comprise:
automatically converting a file produced by the first pluggable functional building block into an object acceptable by a pluggable module of the second pluggable functional building block.

13. A method, comprising:
receiving an indication of input data and a data transformation instruction;
in response to receiving a selection of at least two of a plurality of pluggable functional building blocks and a connection indication between the at least two of the plurality of functional building blocks, automatically composing a workflow comprising a first pluggable functional building block and a second pluggable functional building block, wherein the output of the first pluggable functional building block is automatically transformed into acceptable input for the second pluggable functional building block by the workflow utilizing the input data and the data transformation instruction; and
automatically publishing the workflow as a web service.

14. The method of claim 13, further comprising:
using a standardized workflow interface for communication between the first pluggable functional building block and the second pluggable functional building block.

15. The method of claim 13, further comprising:
automatically converting between a workflow interface associated with the first pluggable functional building block to a workflow interface associated with the second pluggable functional building block.

16. The method of claim 13, further comprising:
converting between a schema associated with the first pluggable functional building block to a schema associated with the second pluggable functional building block.

17. The method of claim 13, further comprising:
automatically converting between a data format associated with the first pluggable functional building block to a data format associated with the second pluggable functional building block.

18. The method of claim 13, further comprising:
automatically converting a file produced by the first pluggable functional building block into an object acceptable by a pluggable module of the second pluggable functional building block.

* * * * *